United States Patent
Sugimura

(10) Patent No.: US 6,984,070 B2
(45) Date of Patent: Jan. 10, 2006

(54) CRANKSHAFT BEARING

(75) Inventor: Kazuaki Sugimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 387 days.

(21) Appl. No.: 10/600,761

(22) Filed: Jun. 23, 2003

(65) Prior Publication Data

US 2004/0007199 A1   Jan. 15, 2004

(30) Foreign Application Priority Data

Jul. 12, 2002   (JP) .............................. 2002-203435

(51) Int. Cl.
  *F16C 9/02*  (2006.01)
  *F16C 35/00* (2006.01)
(52) U.S. Cl. .................. 384/294; 384/433; 123/195 R
(58) Field of Classification Search ................ 384/294, 384/288, 432, 433, 429, 430, 255; 123/195 R, 123/43 B, 78 F
See application file for complete search history.

(56) References Cited

U.S. PATENT DOCUMENTS

| | | | | |
|---|---|---|---|---|
| 4,311,349 A | * | 1/1982 | Roberts | 384/288 |
| 4,450,797 A | * | 5/1984 | Moser et al. | 123/78 F |
| 6,247,430 B1 | * | 6/2001 | Yapici | 123/78 F |
| 2002/0043229 A1 | * | 4/2002 | Yapici | 123/78 F |

FOREIGN PATENT DOCUMENTS

| | | |
|---|---|---|
| JP | 6-108917 A | 4/1994 |
| JP | 9-269004 A | 10/1997 |

OTHER PUBLICATIONS

JIII Journal of Technical Disclosure No. 93-32870 dated Dec. 1, 1993.
Collected Examples of Automobile Engineering No. 94312 dated Mar. 25, 1994.

* cited by examiner

*Primary Examiner*—Thomas R. Hannon
*Assistant Examiner*—Justin M. Krause
(74) *Attorney, Agent, or Firm*—Kenyon & Kenyon

(57) ABSTRACT

In a bearing metal fitted to a journal bearing portion where a center of a bearing metal fitting hole is deviated from a reference straight line in a direction orthogonal to the reference straight line at a time of mounting a cylinder head, a thickness, in a direction parallel to a direction in which the center of the bearing metal fitting hole is deviated, of one of an upper metal and a lower metal, which is positioned in the same direction as the direction in which the center of the bearing metal fitting hole is deviated, is increased by an amount by which the center of the bearing metal fitting hole is deviated from the reference straight line, and a thickness, in the direction parallel to the direction in which the center of the bearing metal fitting hole is deviated, of one of the upper metal and the lower metal, which is positioned in a direction opposite to the direction in which the center of the bearing metal fitting hole is deviated, is reduced by the amount by which the center of the bearing metal fitting hole is deviated from the reference straight line.

11 Claims, 8 Drawing Sheets

F I G. 5A
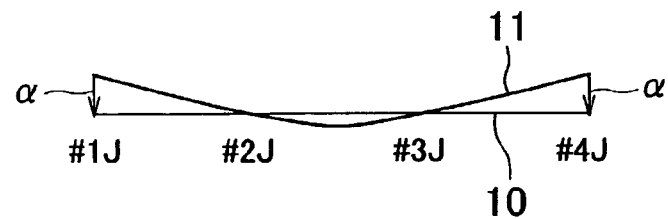
F I G. 5B
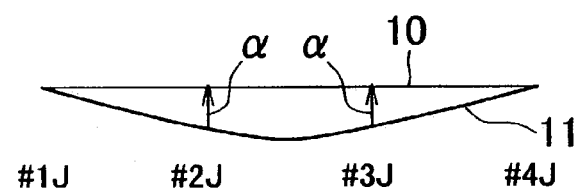
F I G. 5C
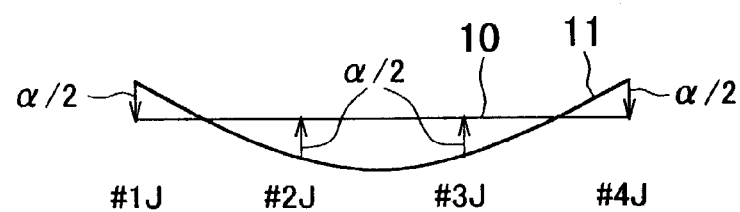
F I G. 5D
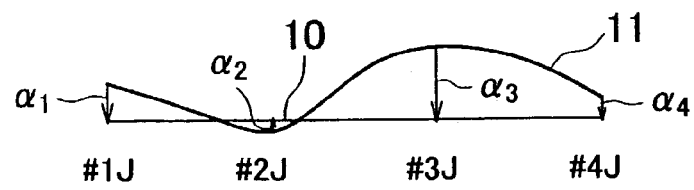

CRANKSHAFT BEARING

INCORPORATION BY REFERENCE

The disclosure of Japanese Patent Application No. 2002-203435 filed on Jul. 12, 2002 including the specification, drawings and abstract is incorporated herein by reference in its entirety.

BACKGROUND OF THE INVENTION

1. Field of the Invention

The invention relates to a crankshaft bearing of an internal combustion engine.

2. Description of the Related Art

In a cylinder block of an internal combustion engine of an automobile, when a load is applied in a direction orthogonal to a longitudinal direction of the cylinder block, bending deformation occurs and a degree of concentricity of bearing metal fitting holes in journal bearing portions and a degree of concentricity of bearing metal holes are reduced (as described, for example, in Japanese Patent Laid-Open Publication No. 9-269004). Bearing metal fitting holes in all journal bearing portions may be mechanically processed in a cylinder block alone before a cylinder head and a cylinder head gasket are mounted on the cylinder block so that the bearing metal fitting holes in all the journal bearing portions become concentric. In this case, when the cylinder head gasket and the cylinder head are mounted, a degree of concentricity of the bearing metal fitting holes and a degree of concentricity of bearing metal holes are reduced due to elastic deformation of the cylinder block. Accordingly, friction that occurs when the crankshaft rotates becomes extremely large depending on a degree of reduction in the degree of concentricity.

SUMMARY OF THE INVENTION

In a method for improving deformation of a cylinder bore at a time of mounting a cylinder head, processing is performed while a dummy head is mounted. Based on the same concept, a method is conceived, in which bearing metal fitting holes in all journal bearing portions in a cylinder block are mechanically processed while a dummy cylinder head is mounted on the cylinder block when the cylinder block is mechanically processed. According to the method, it is considered that the degree of concentricity of bearing metal holes in all the journal bearing portions is good after an engine is assembled, that is, after the cylinder head gasket and the cylinder head are mounted.

It is an object of the invention to provide a crankshaft bearing in which concentricity of bearing metal fitting holes in all journal bearing portions can be achieved while a cylinder head and a cylinder head gasket that are not dummies and are actually used are mounted on a cylinder block.

A crankshaft bearing according to a first aspect of the present invention includes a cylinder block which constitutes an internal combustion engine, and which includes plural first concave portions on a side opposite to a side where a cylinder head is provided, a cap including plural second concave portions each of which is formed at a position facing each of the first concave portions of the cylinder block such that one predetermined space is formed between each of the plural first concave portions and each of the plural second concave portions when the cap is fitted to the cylinder block and plural bearing metals including plural upper metals and plural lower metals, each of the upper metals being fitted to each of the plural first concave portions, each of the lower metals being fitted to each of the plural second concave portions, and each of the upper metals and each of the lower metals being combined so as to form an opening portion having a cross section in a substantially circular shape. In the crankshaft bearing, axes passing through centers of the predetermined spaces are concentric before the cylinder head and a cylinder head gasket are mounted on the cylinder block; an axis passing through a center of at least one of the predetermined spaces is deviated from a given reference straight line in a direction orthogonal to the reference straight line due to elastic bending deformation of the cylinder block when the cylinder head and the cylinder head gasket are mounted on the cylinder block; and thickness, in a direction parallel to the direction in which the axis is deviated, of one of the upper metal and the lower metal, which is positioned in the same direction as the direction in which the axis is deviated, is increased by an amount by which the axis is deviated from the reference straight line, and a thickness, in the direction parallel to the direction in which the axis is deviated, of one of the upper metal and the lower metal, which is positioned in a direction opposite to the direction in which the axis is deviated, is reduced by an amount by which the axis is deviated from the reference straight line.

According to the first aspect, when dummy bearing metals having equal thickness over the entire circumference are fitted in the bearing metal fitting holes in all the journal bearing portions, the bearing metal holes in all the journal bearing portions are concentric in the stage where the cylinder block is alone (that is, the stage where the cylinder head is not mounted on the cylinder block). In this stage, even if the crankshaft is fitted to the bearing metals in all the journal bearing portions that are concentric and is rotated, friction is small. Consequently, it is easy to manage the bearing metal fitting holes in the cylinder block alone, as compared with the case where the processing is performed while a dummy head is mounted. In this case, a degree of concentricity is reduced and management of the bearing metal fitting holes is difficult in the stage where the actual cylinder head is not mounted. The axis passing through the center of the inner peripheral surface (the bearing metal hole) constituting the bearing metal fitted to each of the bearing metal fitting holes at both ends is deviated by the amount by which the center of the bearing metal fitting hole is deviated from the reference straight line; with respect to the axis passing through the center of the outer peripheral surface of the bearing metal (that is, the centers of the inner periphery and the outer periphery of the bearing metal are deviated from each other by the amount). Consequently, the bearing metal holes in all the journal bearing portions are concentric. Accordingly, the rotational sliding friction of the crankshaft fitted in the bearing metal holes can be made small and friction loss can be reduced, as compared with the conventional case.

A bearing metal according to a second aspect of the present invention includes an upper metal which is fitted to a first concave portion formed on a side opposite to a side where a cylinder head is provided in a cylinder block constituting an internal combustion engine; and a lower metal which forms, together with the upper metal, a cross section in a substantially ring shape having an outer periphery and an inner periphery when the lower metal is fitted to a second concave portion formed in a cap that is provided on the side opposite to the side where the cylinder head is provided in the cylinder block; wherein while the upper metal and the lower metal are combined, a thickness of each of the upper metal and the lower metal is formed such that a center of the inner periphery is deviated with respect to a center of the outer periphery.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5A to FIG. 5D are diagrams each of which shows a configuration of a main portion according to the first embodiment of the invention;

DETAILED DESCRIPTION OF THE PREFERRED EMBODIMENTS

Figure 6:
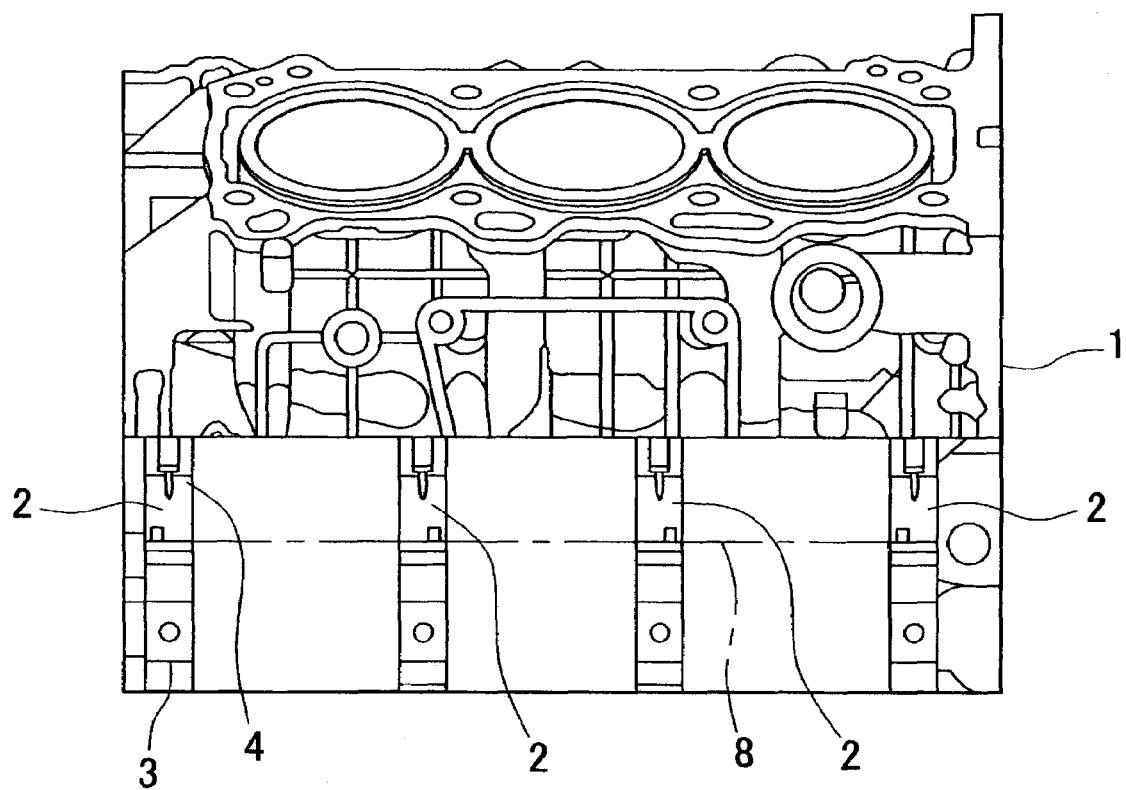
FIG. 6 is a left lateral view (a lower half thereof is a sectional view) showing a configuration of a cylinder block of a commonly used V6 engine.
Figure 7:
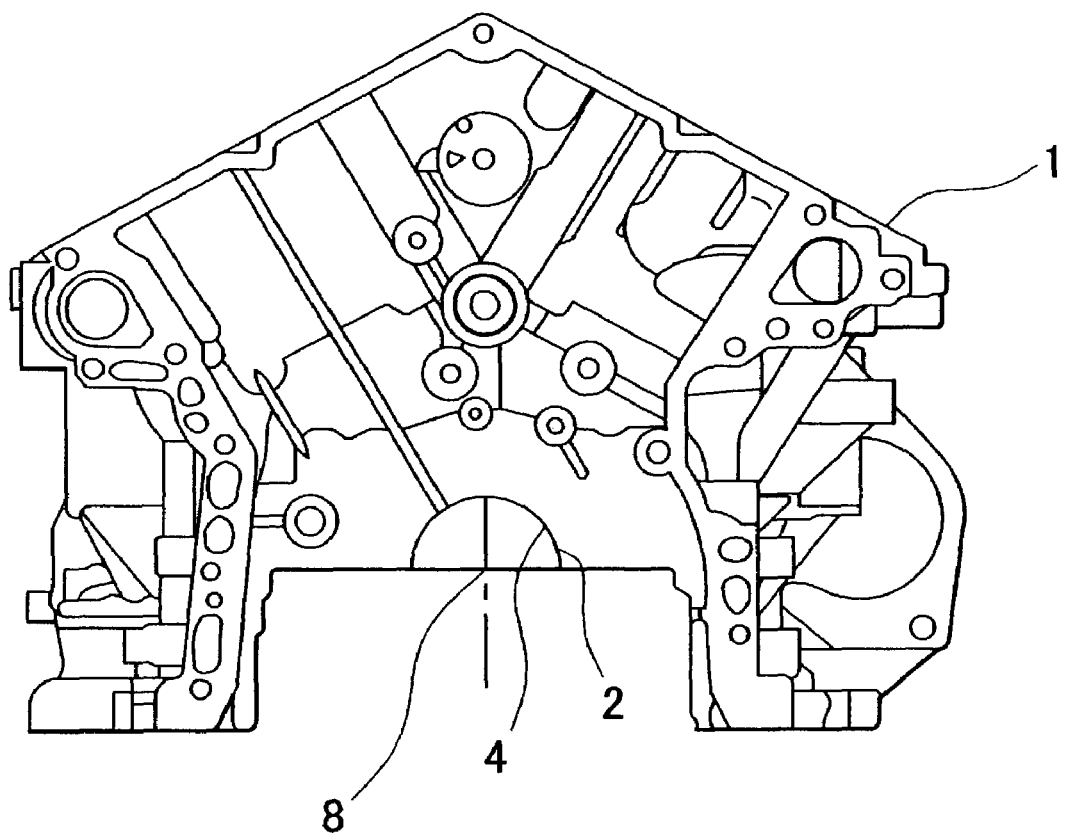
FIG. 7 is a front view showing a configuration of a front side of the cylinder block of the V6 engine shown in FIG. 6.

Hereinafter, a crankshaft bearing according to a first embodiment of the invention will be described with reference to FIG. 1 to FIG. 8. Each of FIG. 6 and FIG. 7 shows an example of a cylinder block of an internal combustion engine to which a crankshaft bearing according to the first embodiment of the invention is applied. In the embodiment, a case in which the invention is applied to a V-type six-cylinder engine will be described. However, the engine to which the crankshaft bearing according to the invention is applied is not limited to the V-type six-cylinder engine, and may be V-type engines other than a six-cylinder engine, or may be an inline engine with plural cylinders, instead of a V-type engine.

As shown in FIG. 7, in a cylinder block 1, a cylinder head gasket and a cylinder head are mounted on each of right and left upper surfaces so as to constitute right and left banks. Each cylinder head is fastened to the cylinder block 1 by bolts. In the cylinder block 1, plural journal bearing portions 2 for rotatably supporting a crankshaft are provided, as shown in FIG. 6.

The plural journal bearing portions 2 are provided at four positions which are referred to as a first journal (#1J), a second journal (#2J), a third journal (#3J), and a fourth journal (#4J). Each of the journal bearing portions 2 includes the cylinder block 1, a bearing metal fitting hole 4 that is formed between the cylinder block 1 and a cap 3 fitted to the cylinder block 1, and a bearing metal 5 fitted in the bearing metal fitting hole 4.

The bearing metal fitting hole 4 is formed as an opening portion having a cross section in a substantially circular shape, by combining the cylinder block 1 and the cap 3. The bearing metal fitting hole 4 is formed for fitting a bearing metal 5. Each bearing metal 5 includes an upper metal 6 and a lower metal 7, as shown in FIG. 1.

This upper metal 6 is fitted to an inside of the bearing metal fitting hole 4 that is formed in the cylinder block 1. Also, the lower metal 7 is fitted to an inside of the bearing metal fitting hole 4 that is formed in the cap 3.

Figure 1:
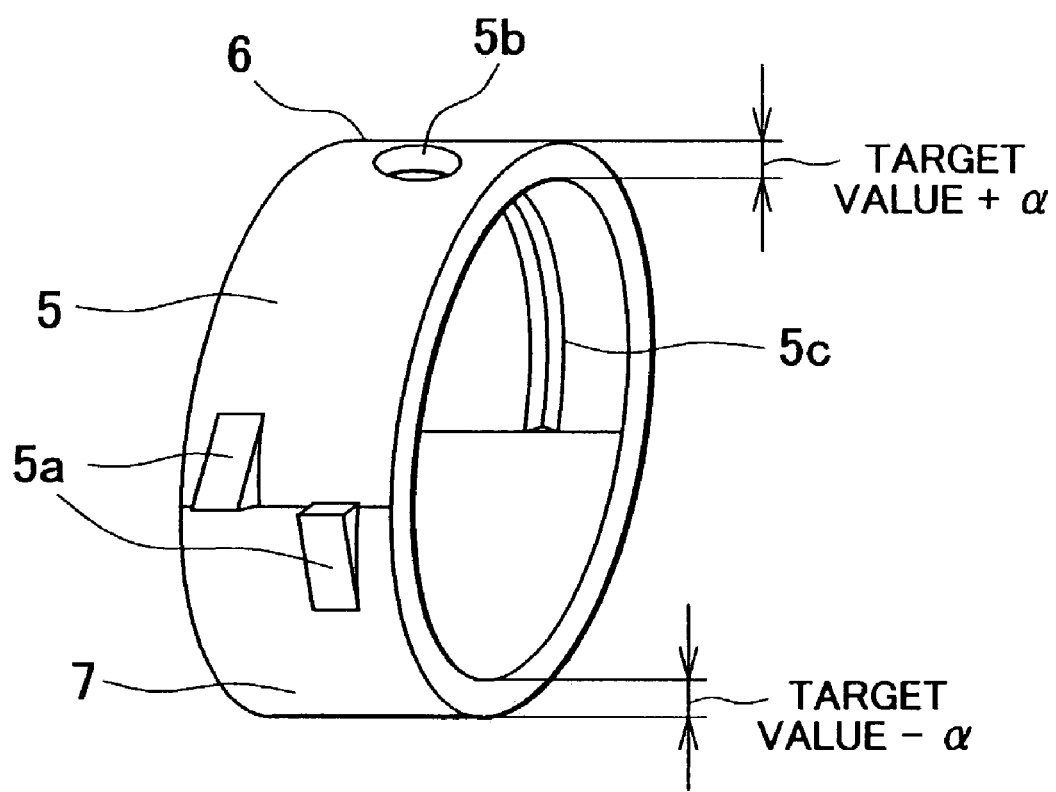
FIG. 1 is a perspective view showing a configuration of a bearing metal used for a crankshaft bearing according to a first embodiment of the invention.

As shown in FIG. 1, positioning claws 5a, a lubricant supply hole 5b, and a lubricant supply groove 5c are formed at predetermined positions in each bearing metal 5. The positioning claws 5a are formed at outer periphery-side end portions of both the upper metal 6 and the lower metal 7 such that one of the positioning claws 5a is opposed to the other. The lubricant supply hole 5b is formed as an opening in a substantially circular shape at a predetermined position in a medium side portion of the upper metal 6. The lubricant supply groove 5c is formed as a notch in the vicinity of a circumferential center portion in an inner peripheral surface of the upper metal 6.

When the cylinder head and the cylinder head gasket are not mounted on the cylinder block 1 (that is, before mounting the cylinder head and the cylinder head gasket), the bearing metal fitting holes 4 in all the journal bearing portions 2 are mutually concentric, and a common axis 8 passes through the centers of the bearing metal fitting holes 4, as shown in FIG. 6.

Figure 8:
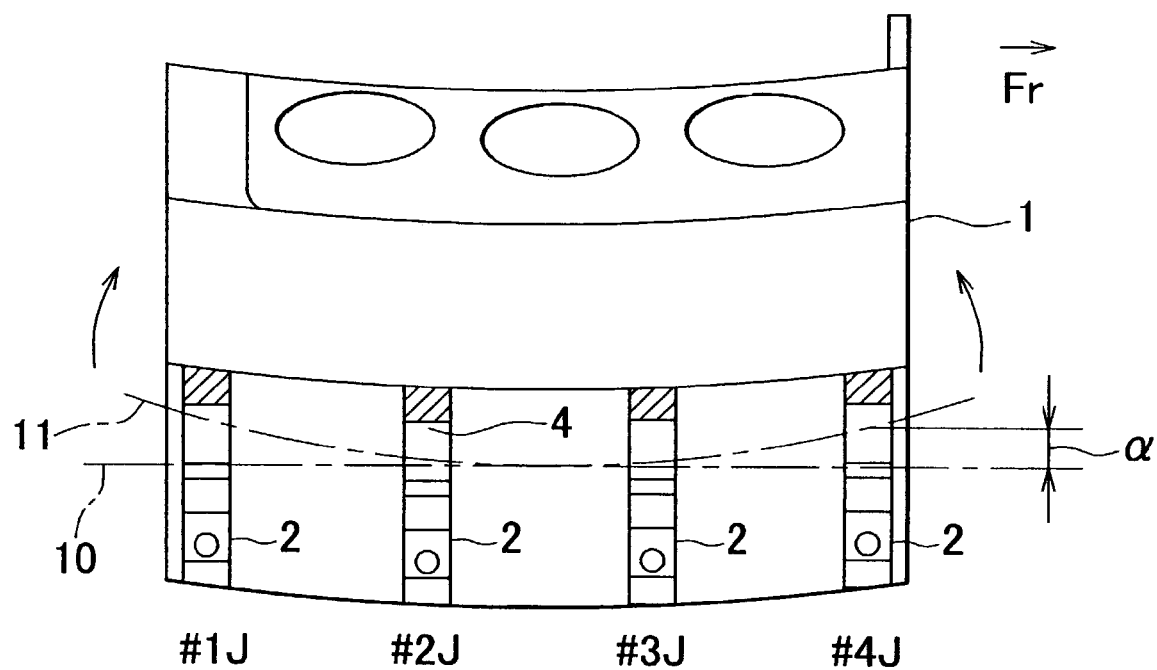
FIG. 8 is a schematic lateral view showing a mode of elastic bending deformation which occurs when a cylinder head and a cylinder head gasket are mounted on an engine cylinder block.

When the cylinder head and the cylinder head gasket are mounted on the cylinder block 1 (that is, at the time of mounting the cylinder head and the cylinder head gasket), a center of the bearing metal fitting hole 4 in at least one of the journal bearing portions 2 is deviated from a reference straight line 10 in a direction orthogonal to the reference straight line 10 due to elastic bending deformation of the cylinder block 1, as shown in FIG. 8. An amount by which the center of the bearing metal fitting hole 4 is deviated from the reference straight line 10 is referred to as α.

The reference straight line 10 may be a straight line that matches the aforementioned common axis 8, a straight line that is parallel to the common axis 8, or a straight line that is inclined with respect to the common axis 8 (however, the inclination needs to be a small inclination which does not increase a frictional force of the rotation of the crankshaft).

The magnitude of α of each of the journal bearing portions 2 may be different. Also, in the case where α of the first journal (#1J) is referred to as $α_1$, α of the second journal (#2J) is referred to as $α_2$, α of the third journal (#3J) is referred to as $α_3$, and α of the fourth journal (#4J) is referred to as $α_4$, $α_1$, $α_2$, $α_3$, and $α_4$ do not need to be the same value. Also, the magnitude of α varies depending on type of the engine, rigidity of the cylinder block, specification of the head gasket, and the like. In the case of a cylinder block of a V-type six-cylinder engine, the magnitude of α is 10 μm to 50 μm.

Also, a curve 11 shown in FIG. 8 and the like is a line connecting the centers of the bearing metal fitting holes 4 when elastic bending deformation of the cylinder block 1 occurs at the time of mounting the cylinder head and the cylinder head gasket.

Figure 3:
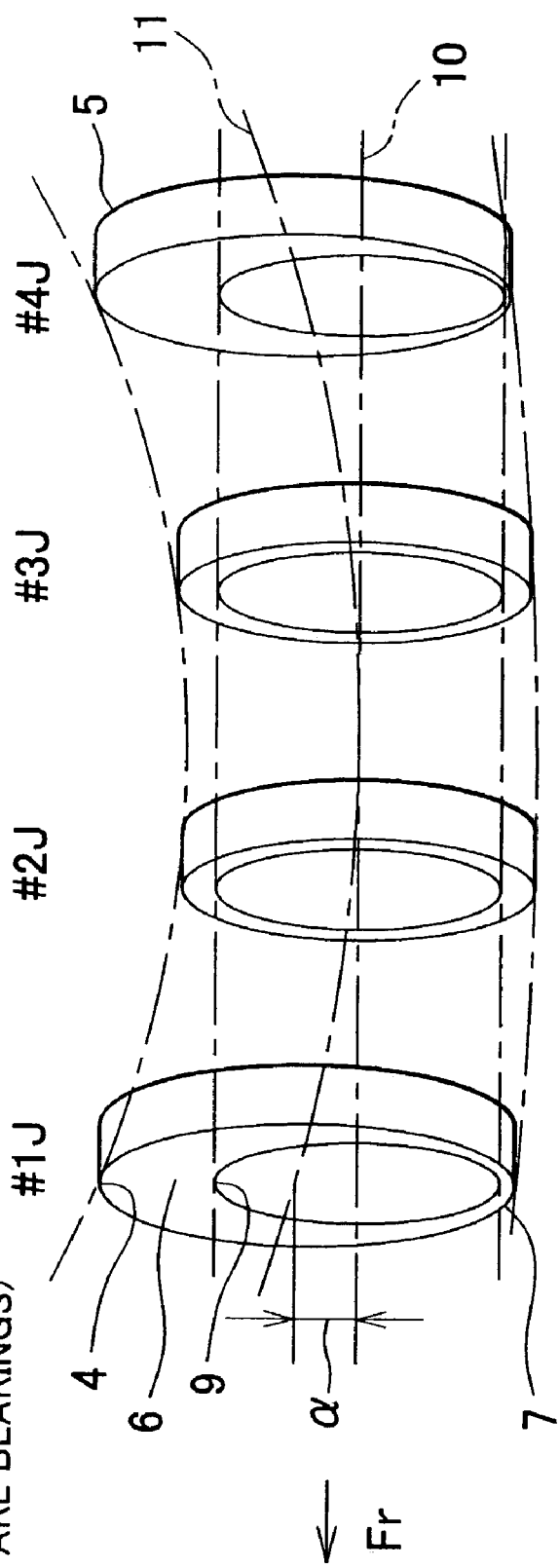
FIG. 3 is a perspective view showing a configuration of a main portion of a cylinder block of the V6 engine according to the first embodiment of the invention.
Figure 4:
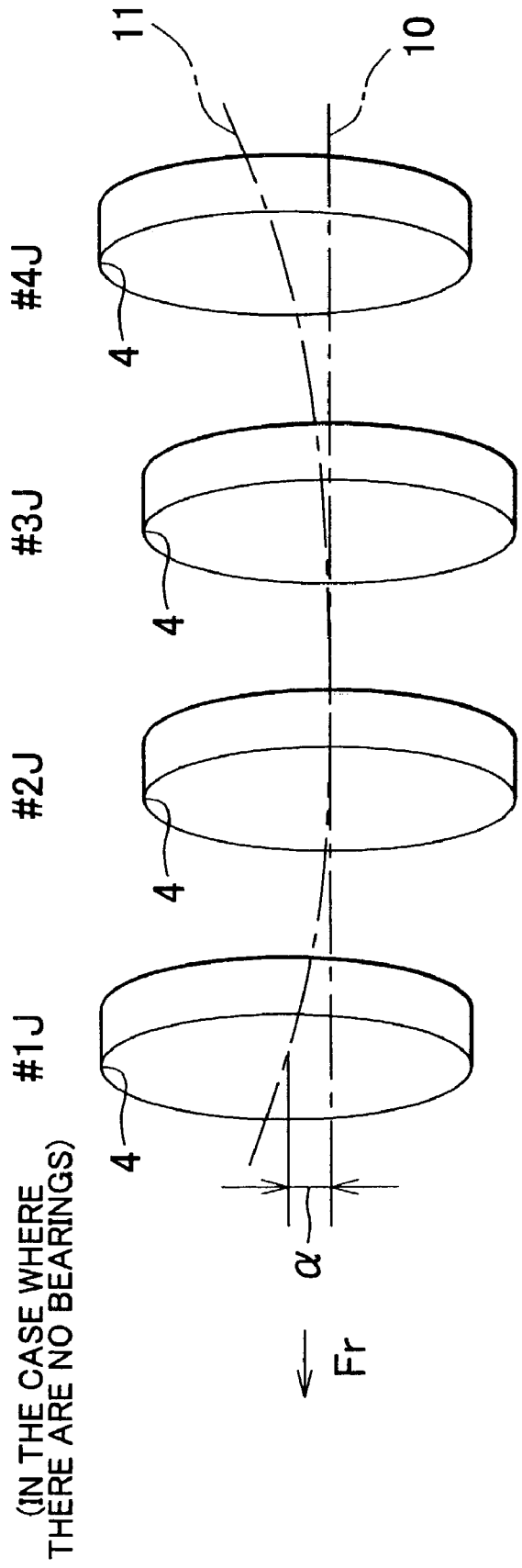
FIG. 4 is a perspective view showing a configuration of the main portion of the cylinder block of the V6 engine according to the first embodiment of the invention.

For example, FIG. 3, FIG. 4, and FIG. 8 show a state where the centers of the bearing metal fitting holes 4 in two journal bearing portions 2 positioned at both longitudinal end portions of the cylinder block 1 are deviated from a reference straight line 10 by the amount α in a direction orthogonal to the straight line 10. In FIG. 3, FIG. 4, and FIG. 8, the reference straight line 10 passes through the centers of the bearing metal fitting holes 4 in two journal bearing portions 2 positioned at a longitudinal center portion of the cylinder block 1.

Also, in the bearing metal 5 fitted to each of the journal bearing portions 2 at both ends where the centers of the bearing metal fitting holes 4 are deviated from the reference straight line 10 in the direction orthogonal to the reference straight line 10 (in the vertical direction in FIG. 3, FIG. 4, and FIG. 8) at the time of mounting the cylinder head and the cylinder head gasket, the thickness, in the direction (the vertical direction in FIG. 3, FIG. 4, and FIG. 8) parallel to the direction in which the center of the bearing metal fitting hole 4 is deviated, of one of the upper metal 6 and the lower metal 7 that is positioned in the same direction as the direction in which the center of the bearing metal fitting hole 4 is deviated (the upper metal 6 in FIG. 3, FIG. 4, and FIG. 8) is increased by the amount α by which the center of the bearing metal fitting hole 4 is deviated from the reference straight line 10.

Also, the thickness, in the direction (the vertical direction in FIG. 3, FIG. 4, and FIG. 8) parallel to the direction in which the center of the bearing metal fitting hole 4 is deviated, of one of the upper metal 6 and the lower metal 7 that is positioned in the direction opposite to the direction in which the center of the bearing metal fitting hole 4 is deviated (the lower metal 7 in FIG. 3, FIG. 4, and FIG. 8) is reduced by the amount α (refer to FIG. 1).

In other words, in each of the journal bearing portions 2 at both ends where the centers of the bearing metal fitting holes 4 are deviated from the reference straight line 10 in the direction orthogonal to the reference straight line at the time of mounting the cylinder head and the cylinder head gasket, the axis passing through the center of the inner peripheral surface (the bearing metal hole 9) of the bearing metal 5 fitted thereto is deviated by the amount α with respect to the axis passing through the center of the outer peripheral surface of the bearing metal 5 in the direction orthogonal to the axis and in the direction opposite to the direction in which the center of the bearing metal fitting hole 4 is deviated.

The bearing metal 5 has a cross section in a substantially ring shape. Also, each of the inner periphery of the bearing metal hole 9 and the outer periphery of the bearing metal 5 has a cross section in a substantially circular shape. It is preferable that the inner periphery of the bearing metal hole 9 be formed so as to have a cross section in a perfect circular shape, because the inner periphery of the bearing metal hole 9 needs to function as a crankshaft bearing.

Figure 2:
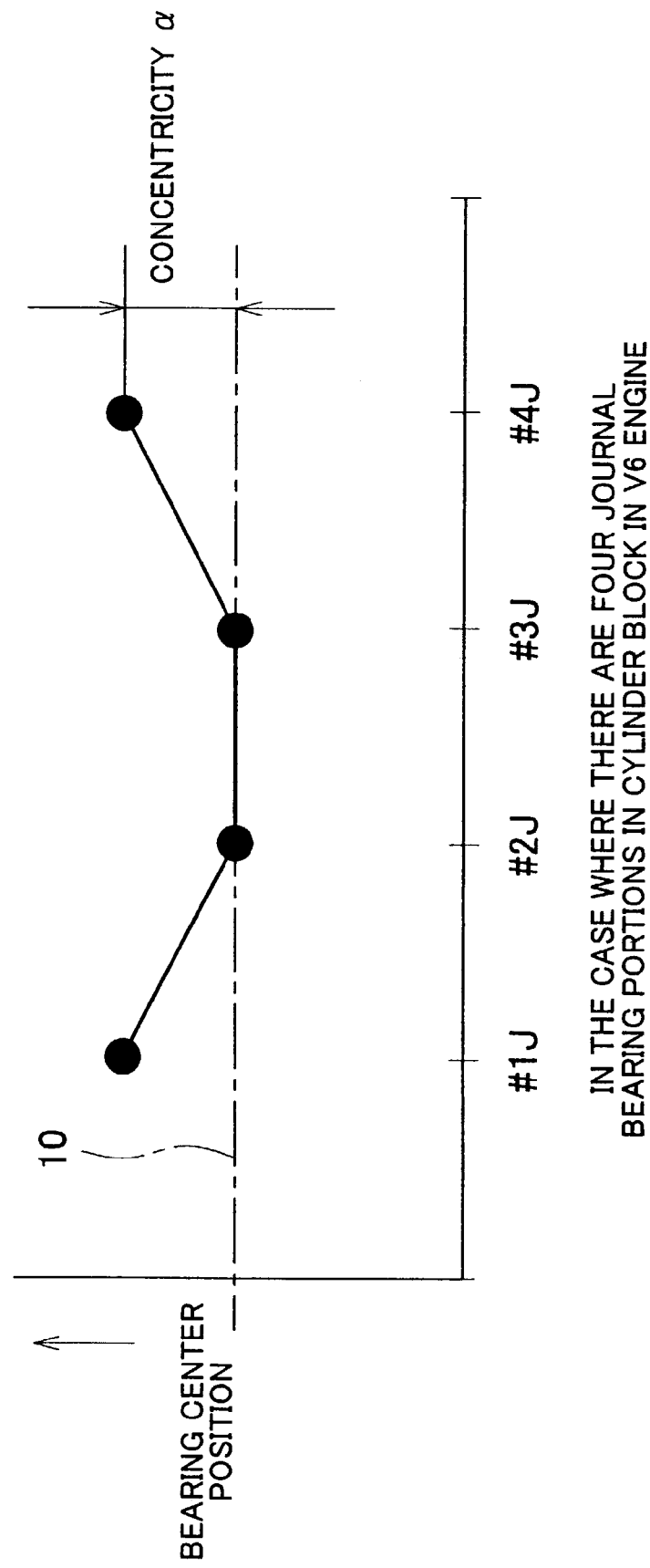
FIG. 2 is a graph showing a bearing center position of each of journal bearing portions and deviation thereof with respect to the center position in a cylinder block of a V6 engine according to the first embodiment of the invention.

In FIG. 2, FIG. 3, and FIG. 4, among the journal bearing portions 2 (the first journal (#1J), the second journal (#2J), the third journal (#3J), and the fourth journal (#4J) from the front side in the case of a vertically mounted engine) the reference straight line 10 passes through the centers of the bearing metal fitting holes 4 in the journal bearing portions 2 (the second journal (#2J) and the third journal (#3J) that are positioned at the longitudinal center portion of the cylinder block 1) (refer to FIG. 8). In the embodiment, the reference straight line 10 matches the common axis 8 that passes through the centers of the bearing metal fitting holes 4 in the plural journal bearing portions 2 before mounting the cylinder head and the cylinder head gasket, or is parallel to the common axis 8.

In FIG. 2, FIG. 3, and FIG. 4, at the time of mounting the cylinder head and the cylinder head gasket, the centers of the bearing metal fitting holes 4 in the journal bearing portions 2 (the first journal (#1J) and the fourth journal (#4J)) that are positioned at both ends are deviated upward by the amount α from the reference straight line 10.

As shown in FIG. 1 and FIG. 3, in the bearing metal 5 fitted in the bearing metal fitting hole 4 in each of the journal bearing portions 2 (the first journal (#1J) and the fourth journal (#4J)) where the centers of the bearing metal fitting holes 4 are deviated upward by the amount α from the reference straight line 10, the thickness of the upper metal 6 is increased by the amount α in the vertical direction, and the thickness of the lower metal 7 is reduced by the amount α in the vertical direction. Thus, the axis passing through the center of the bearing metal hole 9 is deviated downward by the amount α with respect to the axis passing through the center of the outer peripheral surface of the bearing metal 5, and the center of the bearing metal hole 9 is on the reference straight line 10.

In the bearing metal 5 fitted in the bearing metal fitting hole 4 in each of the journal bearing portions 2 (the second journal (#2J) and the third journal (#3J) that are positioned at the center of the row of the journal bearing portions 2 in the longitudinal direction of the cylinder block 1 in FIG. 2, FIG. 3, and FIG. 4) where the centers of the bearing metal fitting holes 4 are not displaced from the reference straight line 10, the upper metal 6 and the lower metal 7 have the equal thickness. Accordingly, the centers of the bearing metal holes 9 in all the journal bearing portions 2 are on the reference straight line 10, as shown in FIG. 3.

Thus, the centers of the bearing metal holes 9 in all the journal bearing portions 2 are on the reference straight line 10, which makes it possible to rotatably support the crankshaft on the reference straight line 10.

As the position of the reference straight line 10 with respect to the journal bearing portions 2, any position may be selected. For example, in FIG. 2 to FIG. 4 and in FIG. 8, a straight line passing through the centers of the bearing metal fitting holes 4 in the journal bearing portions 2 (the second journal (#2J) and the third journal (#3J)) at the center of the row of the journal bearing portions 2 in the longitudinal direction of the cylinder block 1 is selected as the reference straight line 10, as shown in FIG. 5A. Also, the thickness of the bearing metal 5 fitted to each of the journal bearing portions 2 (the first journal (#1J), the fourth journal (#4J)) at both ends is changed (the center of the inner periphery of the bearing metal 5 is deviated downward with respect to the center of the outer periphery), as shown in FIG. 5A.

Alternatively, as in the case shown in FIG. 5B, a straight line passing through the centers of the bearing metal fitting holes 4 in the journal bearing portions 2 that are positioned at both ends may be selected as the reference straight line 10. In this case, the thickness of the bearing metal 5 fitted to each of the journal bearing portions 2 (the second journal (#2J), the third journal (#3J)) at the center is changed in the opposite direction as compared with the case of FIG. 5A (the thickness of the upper metal 6 is reduced, and the thickness of the lower metal 7 is increased), while the thickness of the bearing metal 5 in each of the journal bearing portions 2 at both ends remains the same.

Alternatively, as in the case shown in FIG. 5C, a straight line passing through a middle point between the centers of the bearing metal fitting holes 4 in the journal bearing portions 2 at both ends and the centers of the bearing metal fitting holes 4 in the journal bearing portions 2 at the center may be selected as the reference straight line 10. In this case, the axis passing through the center of the inner periphery of the bearing metal 5 fitted to each of the journal bearing portions 2 (the first journal (#1J), the fourth journal (#4J)) at both ends is deviated downward with respect to the axis passing through the center of the outer periphery by an amount $\alpha/2$ (or an amount $\alpha/n$. Note that n is a number equal to or larger than 1, and n is not limited to an integral number). In addition, the axis passing through the center of the inner periphery of the bearing metal 5 in each of the journal bearing portions 2 (the second journal (#2J), the third journal (#3J)) at the center portion is deviated upward with respect to the axis passing through the center of the outer periphery by the amount $\alpha/2$ (or the amount $(n-1)\alpha/n$).

Alternatively, as in the case shown in FIG. 5D, the amount $\alpha$ in all the journal bearing portions 2, that is, $\alpha_1$, $\alpha_2$, $\alpha_3$, and $\alpha_4$ do not need to be the same value. Also, the number of the journal bearing portions 2 may be four, or a number other than four.

Next, an operation of the crankshaft bearing according to the embodiment will be described. In the case of the crankshaft bearing according to the embodiment, the bearing metal fitting holes 4 in all the journal bearing portions 2 are mechanically processed so as to be concentric in the cylinder block alone without mounting the dummy cylinder head.

In the embodiment, the bearing metal fitting holes 4 are mechanically processed while all the journal bearing portions 2 are aligned so as to be concentric. Therefore, all the bearing metal fitting holes 4 can be processed at a time by using the same tool and by moving the tool linearly, as in the conventional case. Accordingly, it is easy to mechanically process the bearing metal fitting holes 4 and to manage the bearing metal fitting holes 4 (that is, to determine the accuracy of processing) in a stage where the cylinder block is alone (that is, in a stage where the cylinder head is not mounted on the cylinder block).

When dummy bearing metals having equal thickness over the entire circumference are fitted in the bearing metal fitting holes 4 in all the journal bearing portions 2, the bearing metal holes 9 in all the journal bearing portions 2 are concentric in the stage where the cylinder block is alone (that is, the stage where the cylinder head is not mounted on the cylinder block 1). In this stage, even if the crankshaft is fitted to the bearing metals 5 in all the journal bearing portions 2 that are concentric and is rotated, friction is small. Consequently, it is easy to manage the bearing metal fitting holes 4 in the cylinder block alone, as compared with the case where the processing is performed while a dummy head is mounted. In this case, a degree of concentricity is reduced and management of the bearing metal fitting holes 4 is difficult in the stage where the actual cylinder head is not mounted.

When the cylinder head and the cylinder head gasket are actually mounted on the cylinder block 1 so as to be fastened thereto at an engine assembly factory, elastic bending deformation occurs in the cylinder block 1, and the bearing metal fitting hole 4 in at least one of the journal bearing portions 2 is deviated by the amount $\alpha$ from the reference straight line 10 (that is, the axis that passes through the centers of all the journal bearing portions 2 before the cylinder head is mounted) in the direction orthogonal to the reference straight line 10 as shown in FIG. 4.

For example, in the case of FIG. 3, the thickness, in the direction parallel to the direction in which the center of the bearing metal fitting hole 4 is deviated, of each of the upper metal 6 and the lower metal 7 which constitute each of the bearing metal 5 fitted in the bearing metal fitting holes 4 at both ends, is changed from a target thickness (that is, a target thickness when the thickness is equal over the entire circumference) by the amount $\alpha$. Therefore, the vertical thickness of each of the upper metals 6 at both ends (the first journal (#1J), the fourth journal (#4J)) in the longitudinal direction of the cylinder block 1 is increased by the amount $\alpha$, and the vertical thickness of each of the lower metals 7 at both ends is reduced by the amount $\alpha$.

Also, the thickness of each of the upper metals 6 and the lower metals 7 at the center portion in the longitudinal direction of the cylinder block 1 (the second journal (#2J), the third journal (#3J)) remains the same (that is, the thickness is equal). Consequently, the bearing metal holes 9 in all the journal bearing portions 2 are concentric (that is, the centers of all the bearing metal holes 9 are positioned on the reference straight line 10). Accordingly, rotational sliding friction of the crankshaft fitted in the bearing metal holes 9 can be made small and friction loss can be reduced, as compared with the conventional case.

In other words, the axis passing through the center of the inner peripheral surface (the bearing metal hole 9) constituting the bearing metal 5 fitted to each of the bearing metal fitting holes 4 at both ends is deviated by the amount $\alpha$, with respect to the axis passing through the center of the outer peripheral surface of the bearing metal 5 (that is, the centers of the inner periphery and the outer periphery of the bearing metal 5 are deviated from each other by the amount $\alpha$). Consequently, the bearing metal holes 9 in all the journal bearing portions 2 are concentric. Accordingly, the rotational sliding friction of the crankshaft fitted in the bearing metal holes 9 can be made small and friction loss can be reduced, as compared with the conventional case.

Thus, the bearing metal fitting holes 4 in all the journal bearing portions 2 can be processed so as to be concentric only by changing the vertical thickness of each of the bearing metals 9 at both ends (that is, only by deviating the centers of the inner periphery and the outer periphery of the bearing metal 5 from each other by the amount $\alpha$). Accordingly, the friction loss due to rotation of the crankshaft at the time of operating the internal combustion engine can be reduced without changing the conventional processing method.

In the bearing metal 5 fitted in the journal bearing portion 2 where the center of the bearing metal fitting hole 4 is deviated from the reference straight line 10 in the direction orthogonal to the reference straight line 10 at the time of mounting the cylinder head and the cylinder head gasket, the thickness, in the direction parallel to the direction in which the center of the bearing metal fitting hole 4 is deviated, of one of the upper metal 6 and the lower metal 7, which is positioned in the same direction as the direction in which the center of the bearing metal fitting hole 4 is deviated, is increased by an amount by which the center of the bearing metal fitting hole 4 is deviated from the reference straight line 10.

Also, the thickness, in the direction parallel to the direction in which the center of the bearing metal fitting hole 4 is deviated, of one of the upper metal 6 and the lower metal 7, which is positioned in the direction opposite to the direction in which the center of the bearing metal fitting hole 4 is deviated, is reduced by an amount by which the center of the bearing metal fitting hole 4 is deviated from the reference straight line 10.

Accordingly, it is possible to achieve concentricity of the bearing metal holes 4 in all the journal bearing portions 2 while the cylinder head and the cylinder head gasket are mounted on the cylinder block 1.

Also, since concentricity of the bearing metal holes 4 in all the journal bearing portions 2 is achieved before the cylinder head gasket and the cylinder head are mounted on the cylinder block 1 as in the conventional case, processing of the bearing metal fitting holes 4, preparation of the processing line, management of the bearing metal fitting holes 4 at the time of providing service in the market, and quality assurance are easy as in the conventional case.

What is claimed is:

1. A crankshaft bearing comprising:
   a cylinder block which constitutes an internal combustion engine, and which includes plural first concave portions on a side opposite to a side where a cylinder head is provided;
   a cap including plural second concave portions each of which is formed at a position facing each of the first concave portions of the cylinder block such that one predetermined space is formed between each of the plural first concave portions and each of the plural second concave portions when the cap is fitted to the cylinder block; and
   plural bearing metals including plural upper metals and plural lower metals, each of the upper metals being fitted to each of the plural first concave portions, each of the lower metals being fitted to each of the plural second concave portions, and each of the upper metals and each of the lower metals being combined so as to form an opening portion having a cross section in a substantially circular shape,
   wherein axes passing through centers of the predetermined spaces are concentric before the cylinder head and a cylinder head gasket are mounted on the cylinder block,
   wherein an axis passing through a center of at least one of the predetermined spaces is deviated from a given reference straight line in a direction orthogonal to the reference straight line due to elastic bending deformation of the cylinder block when the cylinder head and the cylinder head gasket are mounted on the cylinder block, and
   wherein a thickness, in a direction parallel to the direction in which the axis is deviated, of one of the upper metal and the lower metal, which is positioned in the same direction as the direction in which the axis is deviated, is increased by an amount by which the axis is deviated from the reference straight line, and a thickness, in the direction parallel to the direction in which the axis is deviated, of one of the upper metal and the lower metal, which is positioned in a direction opposite to the direction in which the axis is deviated, is reduced by an amount by which the axis is deviated from the reference straight line.

2. The crankshaft bearing according to claim 1, wherein the reference straight line is provided so as to match the axis passing through the center of at least one of the predetermined spaces.

3. The crankshaft bearing according to claim 2, wherein:
   the bearing metals include first bearing metals and a second bearing metal;
   the first bearing metals are fitted to the spaces that are formed by the first concave portions and the second concave portions at positions that are closest to both ends of the crankshaft;
   the second bearing metal is fitted to the space that is formed by the first concave portion and the second concave portion at a position between the positions at which the first bearing metals are provided;
   the reference straight line is provided so as to pass through centers of the spaces to which the first bearing metals are fitted;
   a thickness of one of the upper metal and the lower metal of the second bearing metal, which is positioned in the same direction as the direction in which the axis is deviated from the reference straight line, is increased by an amount by which the axis is deviated from the reference straight line; and
   a thickness of the other of the upper metal and the lower metal of the second bearing metal, is reduced by the amount by which the axis is deviated from the reference straight line.

4. The crankshaft bearing according to claim 2, wherein:
   the bearing metals include first bearing metals and a second bearing metal;
   the first bearing metals are fitted to the spaces that are formed by the first concave portions and the second concave portions at positions that are closest to both ends of the crankshaft;
   the second bearing metal is fitted to the space that is formed by the first concave portion and the second concave portion at a position between the positions at which the first bearing metals are provided;
   the reference straight line is provided so as to pass through a center of the space to which the second bearing metal is fitted;
   a thickness of one of the upper metal and the lower metal of each of the first bearing metals, which is positioned in the same direction as the direction in which the axis is deviated from the reference straight line, is increased by an amount by which the axis is deviated from the reference straight line; and
   a thickness of the other of the upper metal and the lower metal of each of the first bearing metals, is reduced by the amount by which the axis is deviated from the reference straight line.

5. The crankshaft bearing according to claim 1, wherein the reference straight line is provided so as to be apart from the axes passing through the centers of the predetermined spaces to which the bearing metals are fitted.

6. The crankshaft bearing according to claim 1, wherein:
   the bearing metals include first bearing metals and a second bearing metal; the first bearing metals are fitted to the spaces that are formed by the first concave portions and the second concave portions at positions that are closest to both ends of the crankshaft;
   the second bearing metal is fitted to the space that is formed by the first concave portion and the second concave portion at a position between the positions at which the first bearing metals are provided; and
   the reference straight line is provided such that a distance between the reference straight line and an axis passing through centers of the first bearing metals is equal to a distance between the reference straight line and an axis passing through a center of the second bearing metal.

7. The crankshaft bearing according to claim 1, wherein the reference straight line is provided so as to be parallel to a straight line passing through centers of the plural spaces formed between the cylinder block and the cap.

8. The crankshaft bearing according to claim 1, wherein the reference straight line is provided so as to be inclined with respect to a straight line passing through centers of the plural spaces formed between the cylinder block and the cap.

9. The crankshaft bearing according to claim 1, wherein the crankshaft bearing is applied to one of a V-type engine with plural cylinders and an in-line engine with plural cylinders.

10. A bearing metal comprising:
- an upper metal which is fitted to a first concave portion formed on a side opposite to a side where a cylinder head is provided in a cylinder block constituting an internal combustion engine; and
- a lower metal which is fitted to a second concave portion formed in a cap that is provided on the side opposite to the side where the cylinder head is provided in the cylinder block, and which is combined with the upper metal so as to form the bearing metal,
- wherein the bearing metal has a cross section in a substantially ring shape having an outer periphery and an inner periphery, and
- wherein a thickness of each of the upper metal and the lower metal is formed such that a center of the inner periphery is deviated, while the upper metal and the lower metal are combined, with respect to a center of the outer periphery.

11. The bearing metal according to claim 10, wherein each of the outer periphery and the inner periphery has a perfect circular shape.

* * * * *